Dec. 26, 1939.  W. D. UNRUH ET AL  2,185,045
SCALE PLATFORM LOCKING MECHANISM
Filed Jan. 6, 1939
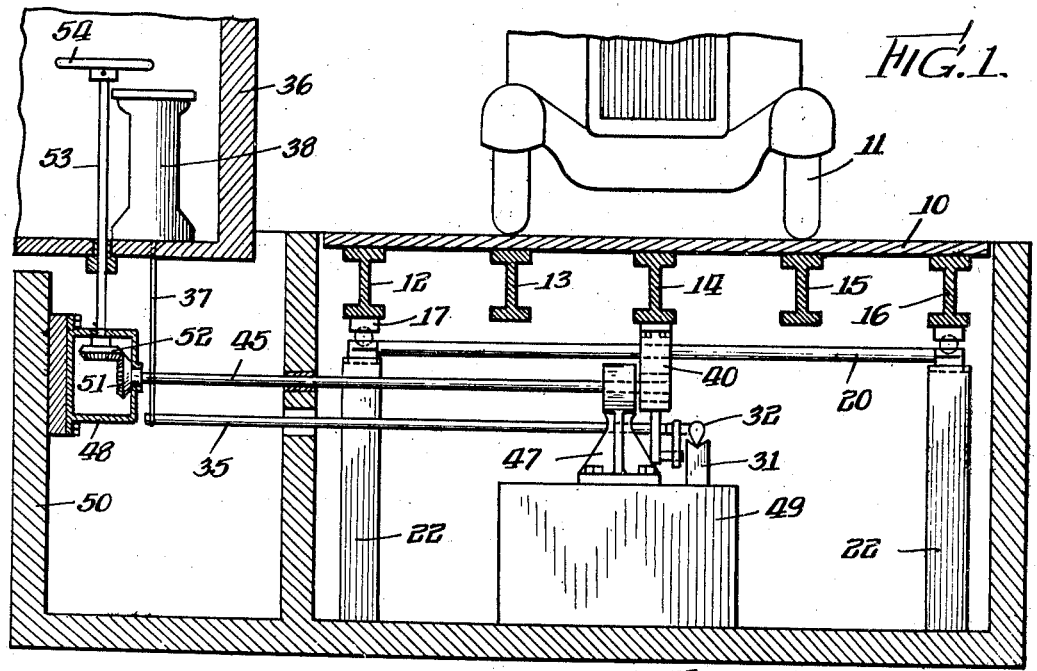
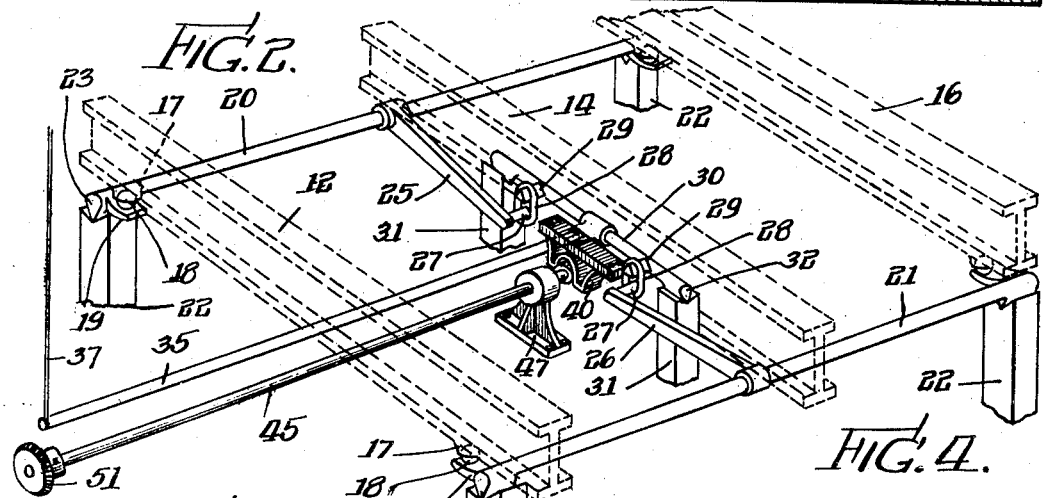
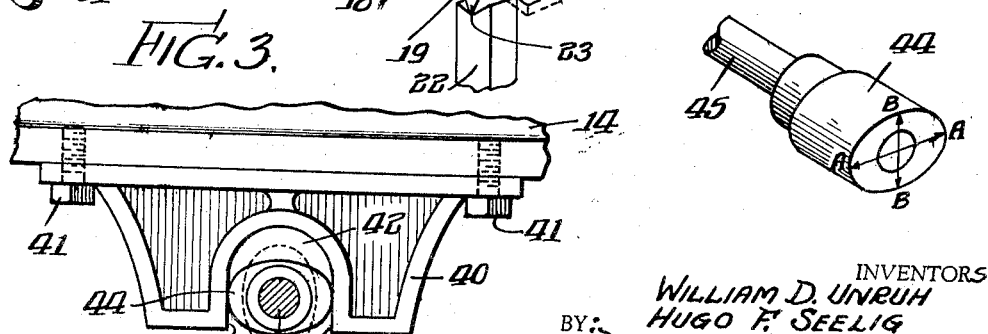
INVENTORS.
WILLIAM D. UNRUH
HUGO F. SEELIG
BY: Cox & Moore ATTORNEYS.

Patented Dec. 26, 1939

2,185,045

UNITED STATES PATENT OFFICE 2,185,045

SCALE PLATFORM LOCKING MECHANISM

William D. Unruh and Hugo F. Seelig, Benton Harbor, Mich., assignors to Auto Specialties Manufacturing Company, St. Joseph, Mich., a corporation of Michigan Application January 6, 1939, Serial No. 249,606

4 Claims. (Cl. 265—72)

This invention relates to locking mechanisms, and particularly to locking mechanisms for scale platforms and the like adapted for heavy duty service.

It is an object of the invention to provide a locking mechanism for scale platforms which is simple in structure, economical to produce, and which will be rugged and effective in operation. The invention provides a locking mechanism for scale platforms and the like which may be readily operated from a suitable operating station, for example adjacent the weight standard of the scale mechanism, and which, when operated, relieves the weighing mechanism and leverage of shocks and disturbances incident to the placing of the load upon or the removal of the load from the scale platform.

More specifically it is an object of the invention to provide a locking mechanism of the type stated which will protect the scale mechanism against those forces which disrupt its accuracy incident to the placing or removal of a load to be weighed, without disabling the weighing mechanism or leverage or otherwise disturbing its adjustment.

Still more particularly, the invention provides means for locking the scale platform without lifting it from its normal points of support. The locking devices can be used with various and different types of scale mechanisms.

Other objects, advantages, and features of the invention will appear from the following specification when taken in connection with the accompanying drawing wherein one preferred embodiment of the invention is illustrated.

In the drawing, wherein like reference numerals refer to like parts throughout:

Fig. 1 is a general assembly view, partly in section of a weighing scale embodying the locking mechanism of the present invention.

Fig. 2 is a partial perspective view of the locking and weighing mechanisms.

Fig. 3 is a detail of a portion of the locking mechanism, showing the locking bracket and cam, and Fig. 4 is a detail perspective view of the locking cam.

The weighing scale illustrated comprises a platform 10 adapted to receive the load to be weighed, for example an automotive truck or vehicle, diagrammatically shown at 11. A series of longitudinally extending I-beams or the like 12, 13, 14, 15 and 16 are secured to the underside of the platform 10. The platform is supported upon the weighing leverage, as best shown in Fig. 2, by means of the end I-beams 12 and 16. These beams carry bearing cup members 17 at each end thereof adapted to rest upon supporting balls 18, the balls in turn being supported upon extensions 19 formed integrally with a pair of shafts 20 and 21 extending transversely underneath the platform 10. The shafts 20 and 21 are supported on a series of support columns 22 by means of knife bearings 23 formed on the ends of the shafts.

A pair of arms 25 and 26 are fixed to the shafts 20 and 21. These arms extend inwardly toward each other, and they are provided with laterally extending pins 27 at their inner ends. These pins cooperate with a pair of links 28, which may be flexible chains, carried by a pair of extensions 29 formed integrally with a shaft 30. This shaft is mounted on support columns 31 by means of knife bearings 32 formed on the end of the shaft, as in the case of shafts 20 and 21. The shaft 30 carries an arm or shaft 35 extending transversely to a point underneath the scale house 36. The end of arm 35 is adapted to be secured to the cord or link 37 which connects with the weight standard 38. This weight standard carries the usual scale beam (not shown) connected to the cord 37, the beam being adapted to receive replaceable and adjustable weights in the usual manner.

In operation as a load is placed upon the scale platform 10, the support mechanism 17, 18 and 19, by which the end I-beams of the scale platform are supported, tends to rotate shafts 20 and 21 upon their supports 22 in proportion to the weight of the load. The rotational forces imparted to shafts 20 and 21 tend to rotate arms 25 and 26, causing pins 27 to pull downwardly upon links 28, which in turn tend to rotate the shaft 30 upon its supports 31. The rotational forces imparted to the shaft 30 are in turn transmitted to the link 37 by means of the arm 35. The link 37, which is thus pulled downwardly in proportion to the load received upon the platform 10, operates the weighing beam mechanism carried by the weight standard 38.

The foregoing weighing mechanism constitutes one suitable form of weighing scale to which the locking mechanism of the present invention may be applied. However, it is to be understood that the particular mechanism above set forth is only for purposes of illustration, and that the locking mechanism of the invention may be applied to various types of installations to which it may be suitable.

The locking mechanism comprises a bracket 40 carried upon the underside of the central longitudinally extending I-beam 14 by means of securing bolts or the like 41. The bracket 40 is provided with a central U-shaped aperture 42 having straight walls 43 formed at the lower part thereof. A rotatable locking cam 44 is arranged within the aperture 42 of the bracket, the cam being secured upon a shaft 45 rotatably journaled at one end in a bearing block 47 and at its other end in a gear box 48. The bearing block 47 is mounted upon a support rest 49, and the gear box 48 is carried upon the wall 50 of the scale pit. A beveled gear 51 is secured to the end of the shaft 45. This gear cooperates with a beveled gear 52 secured to a shaft 53 extending upwardly into the scale house 36. The upper end of the shaft 53 carries a suitable wheel or handle 54 by which the shaft may be rotated.

In operation as the wheel or handle 54 is rotated, shaft 45 will be correspondingly rotated by means of the bevel gearing 51, 52. The rotation of shaft 45 causes the corresponding rotational adjustment of the locking cam 44 within the aperture 42 of the bracket 40. The locking cam is of elliptical form, as best seen in Figs. 3 and 4, the major axis A—A of the cam being equal to the width of the aperture 42, and the minor axis B—B of the cam being somewhat less than the width of the aperture. When the cam is turned into its horizontal position as shown in full lines in Fig. 3, the cam engages the surfaces 43 of the bracket securely locking the bracket from longitudinal movement. Inasmuch as the bracket is rigidly secured to the I-beam 14, the I-beam and the platform 10 will be similarly locked from longitudinal movement. As the cam is rotated into vertical position, as shown in dotted lines in Fig. 3, the bracket will be freed for movement without interference from the locking mechanism. By reference to Fig. 3 it will be seen that when the cam is so disposed in vertical position, it is spaced from the walls of aperture 42 a predetermined distance both horizontally and vertically, thus permitting free movement of the bracket 40 in all directions as may be required in the operation of the weighing mechanism.

The invention provides a simple and economical locking mechanism which may be readily operated by the control 54 from a convenient position within the scale house. The mechanism is rugged and reliable in operation. It effectively locks the scale platform against longitudinal movement as the load is placed upon or removed from the platform, and this locking action is effected without in any way disrupting or otherwise disturbing the normal contacts and relations between the various movable parts of the weighing leverage. In fact, vertical movement of the weighing platform is permitted while the locking mechanism is in locking position. By this means the weight of the load is not carried upon the locking mechanism, as in devices wherein the weighing platform is raised bodily by the locking mechanism from the weighing leverage. On the contrary, the load is always carried by the weighing leverage which is designed to receive it, but at the same time all longitudinal movements of the weighing platform during load application and removal, which are the movements which disrupt the positioning and accuracy of the knife bearings, are eliminated. In view of the fact that the platform is never lifted, the positioning of the knife bearings 23 is not disturbed. The locking mechanism prevents disruption or inaccuracy of the weighing mechanism even when the scale platform is subjected to severe shocks, such as by the dropping of an automotive trailer or the like upon it.

It is obvious that various changes may be made in the specific embodiment of the invention set forth for purposes of illustration without departing from the spirit thereof. Accordingly the invention is not to be limited to the specific embodiment shown and described, but only as indicated in the following claims.

The invention is hereby claimed as follows:

1. A weighing scale comprising a load platform, weighing mechanism operated thereby, means for locking the load platform from movement, said locking means comprising a bracket secured to the load platform and having an aperture with a pair of oppositely disposed vertical surfaces, and an elliptical cam rotatable within said aperture and adapted, on rotation, to engage said vertical surfaces whereby to lock the bracket against movement in a predetermined direction.

2. A weighing scale comprising a load platform, weighing mechanism operated thereby, means for locking the load platform from movement, said locking means comprising a bracket secured to the load platform and having an aperture with a pair of oppositely disposed vertical surfaces, an elliptical cam rotatable within said aperture and adapted, on rotation, to engage said vertical surfaces whereby to lock the bracket against movement in a predetermined direction, and means for rotatably positioning said cam comprising a rotatable shaft to which the cam is secured, a second rotatable shaft, a control member carried by said second shaft and gearing means for connecting said shafts.

3. A locking mechanism for weighing scales and the like comprising a bracket member adapted to be secured to a portion of the scale to be locked, said bracket member having an aperture therein with a pair of oppositely disposed parallel surfaces, and a rotatable elliptical cam arranged within said aperture, the major axis of the cam being equal to the distance between said surfaces.

4. A locking mechanism for weighing scales and the like comprising a bracket member adapted to be secured to a portion of the scale to be locked, said bracket member having an aperture therein with a pair of oppositely disposed parallel surfaces, a rotatable elliptical cam arranged within said aperture, the major axis of the cam being equal to the distance between said surfaces, and means for rotating the cam within the aperture comprising a rotatable shaft upon which the cam is secured, a second shaft, a control member on said second shaft and gearing connections between said shafts.

WILLIAM D. UNRUH.
HUGO F. SEELIG.